(12) United States Patent
Tozawa et al.

(10) Patent No.: US 12,475,783 B2
(45) Date of Patent: Nov. 18, 2025

(54) SIGNAL CONTROL SYSTEM, SIGNAL CONTROL METHOD, AND PROGRAM RECORDING MEDIUM

(71) Applicant: NEC Corporation, Tokyo (JP)

(72) Inventors: Nobuyuki Tozawa, Tokyo (JP); Atsushi Matsuda, Tokyo (JP); Kei Yanagisawa, Tokyo (JP); Kosei Kobayashi, Tokyo (JP); Shouji Haruyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 136 days.

(21) Appl. No.: 18/283,347

(22) PCT Filed: Mar. 24, 2021

(86) PCT No.: PCT/JP2021/012342
§ 371 (c)(1),
(2) Date: Sep. 21, 2023

(87) PCT Pub. No.: WO2022/201380
PCT Pub. Date: Sep. 29, 2022

(65) Prior Publication Data
US 2024/0185713 A1    Jun. 6, 2024

(51) Int. Cl.
*G08G 1/07* (2006.01)
*G06V 20/54* (2022.01)

(52) U.S. Cl.
CPC .............. *G08G 1/07* (2013.01); *G06V 20/54* (2022.01)

(58) Field of Classification Search
CPC .. G08G 1/07; G08G 1/00; G08G 1/01; G08G 1/04; G08G 1/09; G08G 1/065; G06V 20/54; G06V 20/56; G16Y 10/40
See application file for complete search history.

(56) References Cited

U.S. PATENT DOCUMENTS

| | | | |
|---|---|---|---|
| 6,459,403 B1 | 10/2002 | Nakahara et al. | |
| 2015/0153184 A1* | 6/2015 | Mudalige | G06V 20/56 |
| | | | 701/523 |
| 2018/0080778 A1 | 3/2018 | Tadano | |

FOREIGN PATENT DOCUMENTS

| | | |
|---|---|---|
| JP | H07-029091 A | 1/1995 |
| JP | 2001-101572 A | 4/2001 |
| JP | 2003-022493 A | 1/2003 |
| JP | 2003-208693 A | 7/2003 |
| JP | 2003-217087 A | 7/2003 |
| JP | 2008-305090 A | 12/2008 |

(Continued)

OTHER PUBLICATIONS

JP Office Action for JP Application No. 2023-508276, mailed on Oct. 29, 2024 with English Translation.

(Continued)

*Primary Examiner* — Sisay Yacob
(74) *Attorney, Agent, or Firm* — Sughrue Mion, PLLC

(57) ABSTRACT

A signal control system is capable of acquiring an image of a road from a camera disposed around a road in a control target area and includes a passability determination part for determining passability of a road section starting from an intersection on a basis of an abnormality in an image photographed by the camera and a signal control part for controlling a traffic signal device disposed at an intersection included in the road section so as to prevent traffic from inflowing into a closed section.

20 Claims, 14 Drawing Sheets

(56) References Cited

FOREIGN PATENT DOCUMENTS

| | | |
|---|---|---|
| JP | 2013-097550 A | 5/2013 |
| JP | 2013-127663 A | 6/2013 |
| JP | 2014-059200 A | 4/2014 |
| JP | 2016-050922 A | 4/2016 |
| JP | 2018-084955 A | 5/2018 |
| JP | 2019-036147 A | 3/2019 |
| JP | 2019-079189 A | 5/2019 |
| JP | 2019-145029 A | 8/2019 |
| JP | 2021-033880 A | 3/2021 |
| WO | 2016/167368 A1 | 10/2016 |

OTHER PUBLICATIONS

JP Decision of Dismissal of Amendment for Japanese Patent Application No. 2023-508276, mailed on Mar. 11, 2025 with English Translation.
JP Office Action for Japanese Patent Application No. 2023-508276, mailed on Mar. 11, 2025 with English Translation.
International Search Report for PCT Application No. PCT/JP2021/012342, mailed on Apr. 20, 2021.

\* cited by examiner

FIG. 6

| CAMERA ID | PHOTOGRAPHED SECTION | |
|---|---|---|
| 0001 | INTERSECTIONS A001 TO A002 | |
| 0002 | INTERSECTIONS A002 TO A003 | |
| .. | .. | .. |

FIG. 7

| TRAFFIC SIGNAL ID | LOCATION (SECTION) | TYPE |
|---|---|---|
| 1001N | INTERSECTION A001 | TRICOLOR LIGHTS + ARROW LIGHTS (LEFT, STRAIGHT, RIGHT) |
| 1001E | INTERSECTION A001 | TRICOLOR LIGHTS + ARROW LIGHTS (LEFT, STRAIGHT, RIGHT) |
| 1001S | INTERSECTION A001 | TRICOLOR LIGHTS + ARROW LIGHTS (LEFT, STRAIGHT, RIGHT) |
| 1001W | INTERSECTION A001 | TRICOLOR LIGHTS + ARROW LIGHTS (LEFT, STRAIGHT, RIGHT) |
| .. | .. | .. |
| 1002N | INTERSECTION A002 | TRICOLOR LIGHTS + ARROW LIGHT(RIGHT) |
| .. | .. | .. |

SIGNAL CONTROL SYSTEM, SIGNAL CONTROL METHOD, AND PROGRAM RECORDING MEDIUM

This application is a National Stage Entry of PCT/JP2021/012342 filed on Mar. 24, 2021, the contents of all of which are incorporated herein by reference, in their entirety.

FIELD

The present invention relates to a signal control system, signal control method, and program recording medium.

BACKGROUND

Patent Literature 1 discloses a traffic signal control apparatus that is capable of performing traffic-sensitive control to enhance vehicle safety in the event of a disaster, thereby reducing traffic chaos in the event of a disaster. The traffic signal control apparatus described therein stores the evacuation routes in the control area at the time of a disaster, and performs guidance control to set the signal control parameters of the intersections included in the evacuation routes so that vehicles can easily travel along the evacuation routes when a disaster actually occurs in the control area.

[PATENT LITERATURE 1] Japanese Patent Kokai Publication No. JP2008-305090A

SUMMARY

The following analysis is given by the present inventors. The method of Patent Literature 1 requires setting an evacuation route in advance. Therefore, it is not possible to perform guidance that takes account of a closed section in the evacuation route. Further, if a section in the evacuation route is closed due to road surface damage and/or a vehicle accident, a further inflow of vehicles into the section may cause a traffic congestion and delay evacuation.

It is an object of the present invention to provide a signal control system, signal control method, and program recording medium capable of preventing further traffic from inflowing into a section of a road closed caused by road surface damage, vehicle accidents, or the like.

According to a first aspect, there is provided a signal control system, including:
  a camera disposed around a road in a control target area;
  a passability determination part for determining passability of a road section starting from an intersection on a basis of an abnormality in an image photographed by the camera; and
  a signal control part for controlling a traffic signal device disposed at an intersection included in the road section so as to prevent traffic from inflowing into a closed section.

According to a second aspect, there is provided a signal control method performed by a computer capable of acquiring an image from a camera disposed around a road in a control target area, including: determining passability of a road section starting from an intersection on a basis of an abnormality in an image photographed by the camera; and
  controlling a traffic signal device disposed at an intersection included in the road section so as to prevent traffic from inflowing into a closed section.

The present method is associated with a certain machine referred to as a computer capable of acquiring an image from a camera disposed around a road in a control target area.

According to a third aspect, there is provided a computer program ("program" hereinafter) for realizing the functions of the signal control system. This computer program is supplied to a computer apparatus using an input device or from an outside via a communication interface, is stored in a storage device, and operates a processor according to predetermined steps or processes. Further, this program can display processing results thereof including an intermediate state as necessary via a display device step by step or can communicate with the outside via the communication interface. For example, the computer apparatus for this purpose is typically provided with a processor, a storage device, an input device, a communication interface and a display device as needed, which can be connected to each other via a bus. In addition, this program can be recorded in a computer-readable (non-transitory) storage medium. In other words, the present invention can also be realized as a computer program product.

According to the present invention, it becomes possible to contribute to preventing further traffic from inflowing into a section of a road closed caused by road surface damage, vehicle accidents, or the like.

BRIEF DESCRIPTION OF DRAWINGS

FIG. 6 is a drawing showing an example of camera information stored in a camera information storage part according to the first example embodiment of the present invention.

FIG. 7 is a drawing showing an example of traffic signal information stored in a traffic signal information storage part according to the first example embodiment of the present invention.

EXAMPLE EMBODIMENTS

Figure 1:
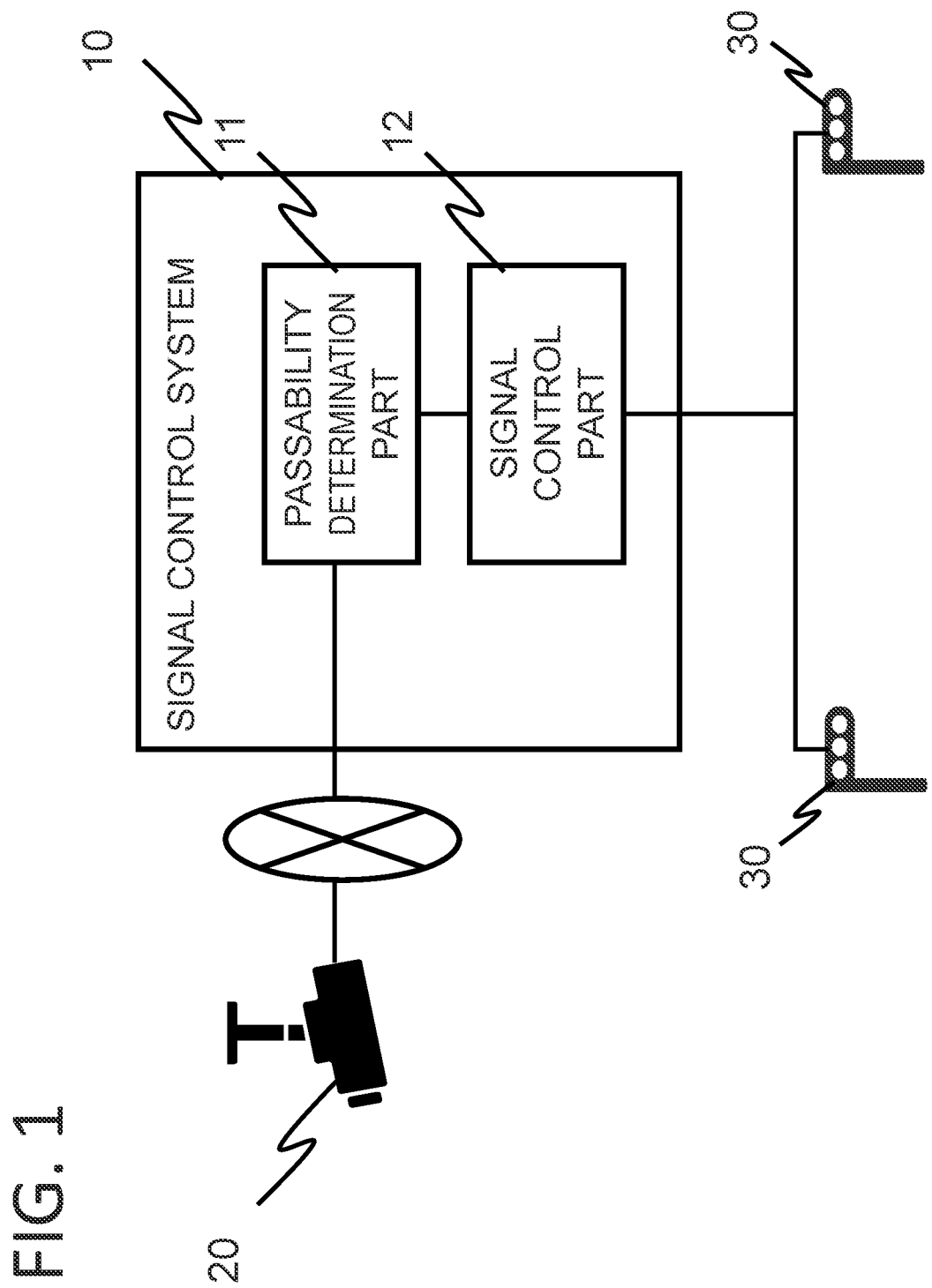
FIG. 1 is a drawing illustrating a configuration of one example embodiment of the present invention.

First, an outline of one example embodiment of the present invention will be given with reference to the drawings. In the following outline, various components are denoted by reference signs for the sake of convenience. That is, the following reference signs are merely used as examples to facilitate understanding of the present invention. Thus, the description of the outline is not meant to limit the present invention to the illustrated modes. An individual connection line between blocks in the drawings, etc. referred to in the following description signifies both one-way and two-way directions. A unidirectional arrow schematically illustrates a principal signal (data) flow and does not exclude bidirectionality. In addition, while a port or an interface is present at an input/output connection point of an individual block in the relevant drawings, illustration of the port or the interface is omitted. A program is executed via a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner.

In one example embodiment, as shown in FIG. 1, the present invention can be realized by a signal control system 10 configured to be able to acquire an image of a road from a camera 20 disposed around a road in a control target area. The signal control system 10 is provided with a passability determination part 11 and a signal control part 12 capable of controlling a traffic signal device (hereinafter "traffic signal") 30.

More concretely, the passability determination part 11 determines the passability of a road section starting from an intersection on the basis of an abnormality in an image photographed by the camera 20. The signal control part 12 controls a traffic signal at an intersection included in the road section so as to prevent traffic from inflowing into a closed section.

Figure 2:
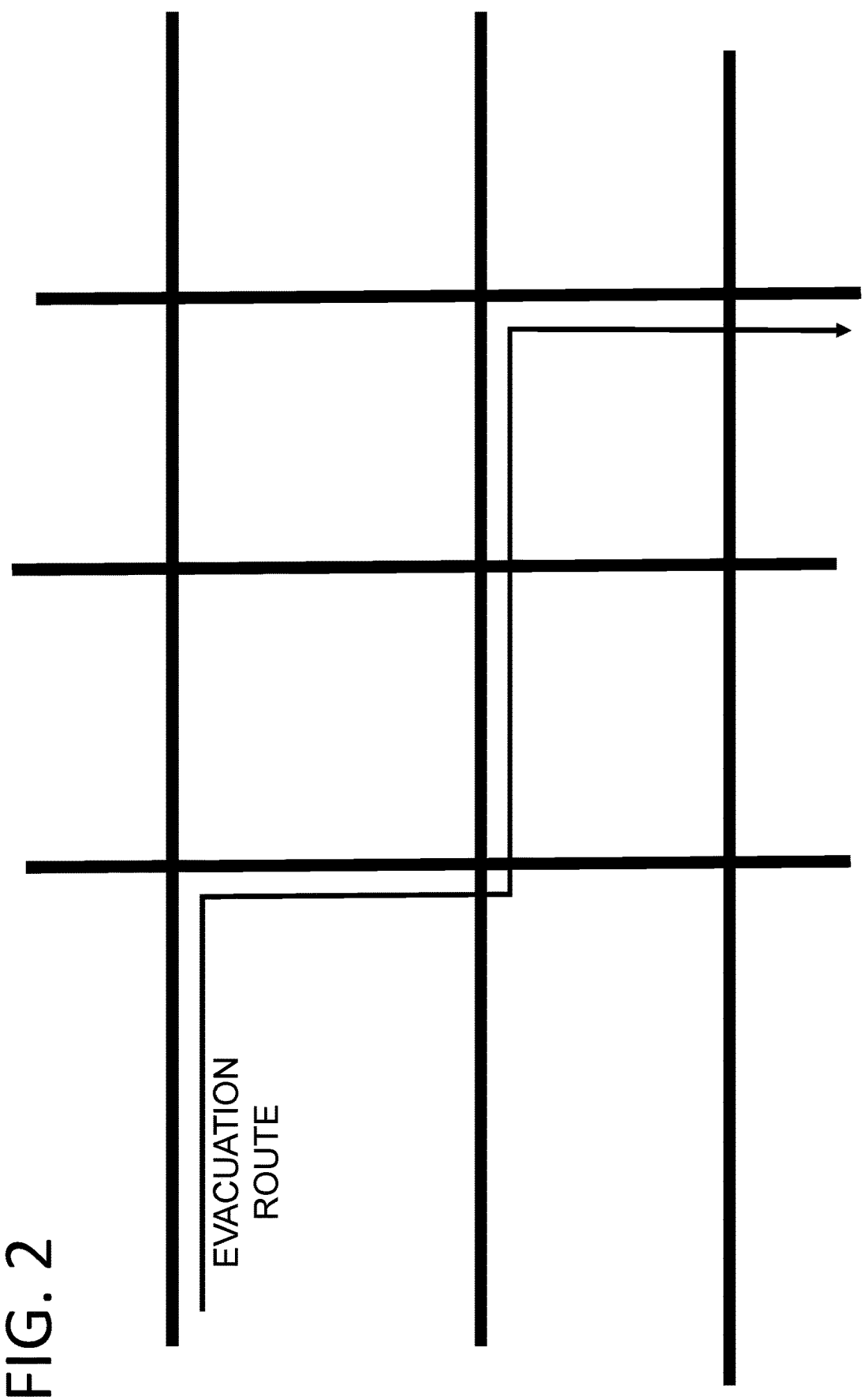
FIG. 2 is a drawing for explaining an operation of one example embodiment of the present invention.

For example, it is presumed that an evacuation route has been set up in the control target area as shown in FIG. 2. Then, when detecting an abnormality in an image photographed by the camera 20, the signal control system 10 operates as follows.

Figure 3:
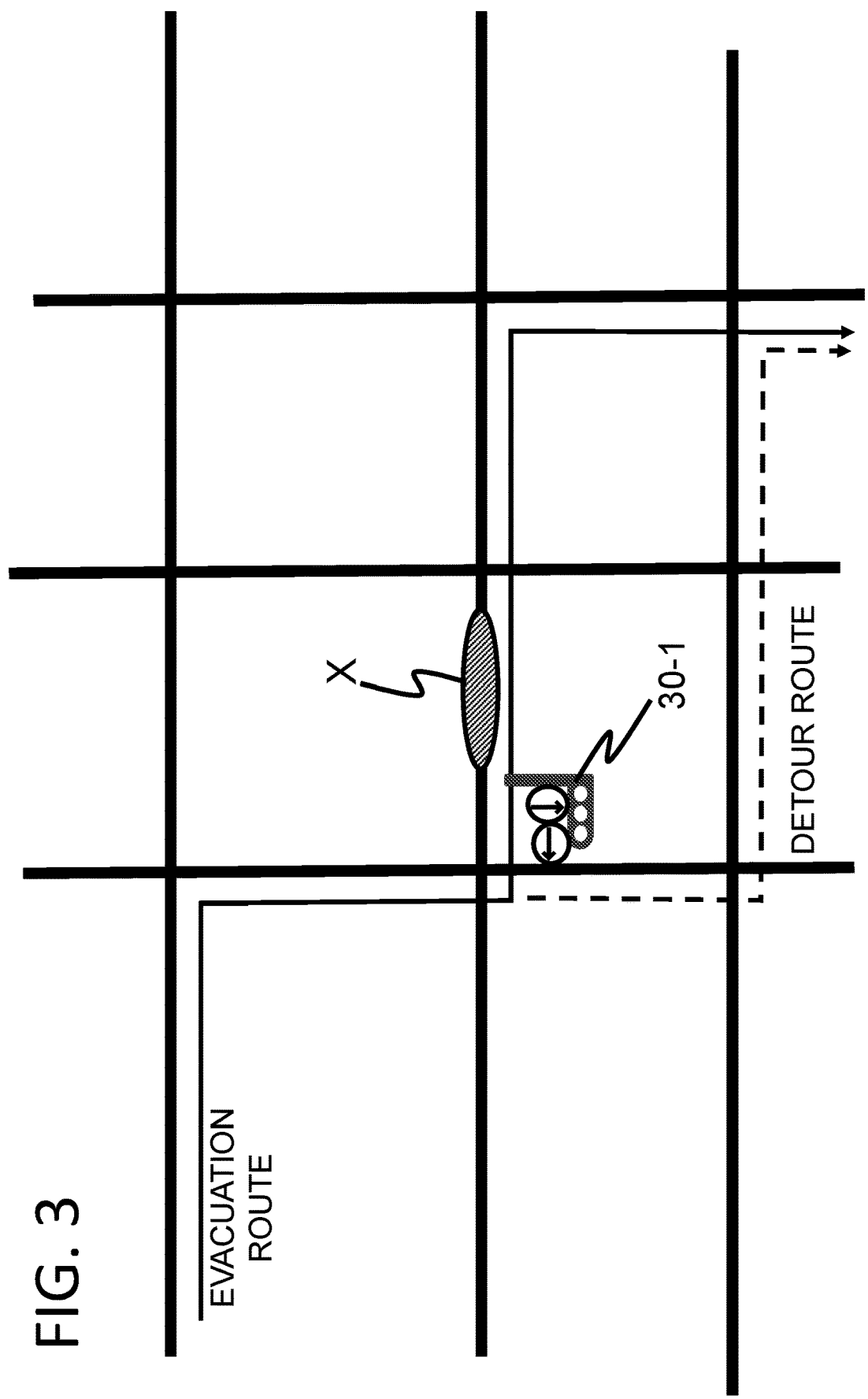
FIG. 3 is a drawing for explaining the operation of one example embodiment of the present invention.

First, the signal control system 10 determines passability of a road section starting from an intersection on the basis of the abnormality in the image photographed by the camera 20. Here, it is presumed that an abnormal area, indicated by sign X in FIG. 3, is detected and determined to be impassable.

At this time, the signal control part 12 controls traffic signals at an intersection included in the road section so as to prevent traffic from inflowing into a closed section where the abnormal area indicated by the sign X is detected. In the example of FIG. 3, signal control is performed using a green arrow light to prevent vehicles coming from the north (the top of FIG. 3) along the evacuation route from entering the closed section (concretely, prohibiting left turns).

This prevents vehicles coming from the north (the top of FIG. 3) along the evacuation route from entering the closed section to worsen congestion at the site and to cause further secondary damage to the vehicles. In this example, the green arrow light is used to prohibit entry into the closed section, but the signal light used is not limited thereto as long as it can prevent entry into the closed section. For example, it may be notified that entry into the closed section is prohibited by displaying a message to a driver using voice or a display board, together with lighting or flashing a red light.

First Example Embodiment

Figure 4:
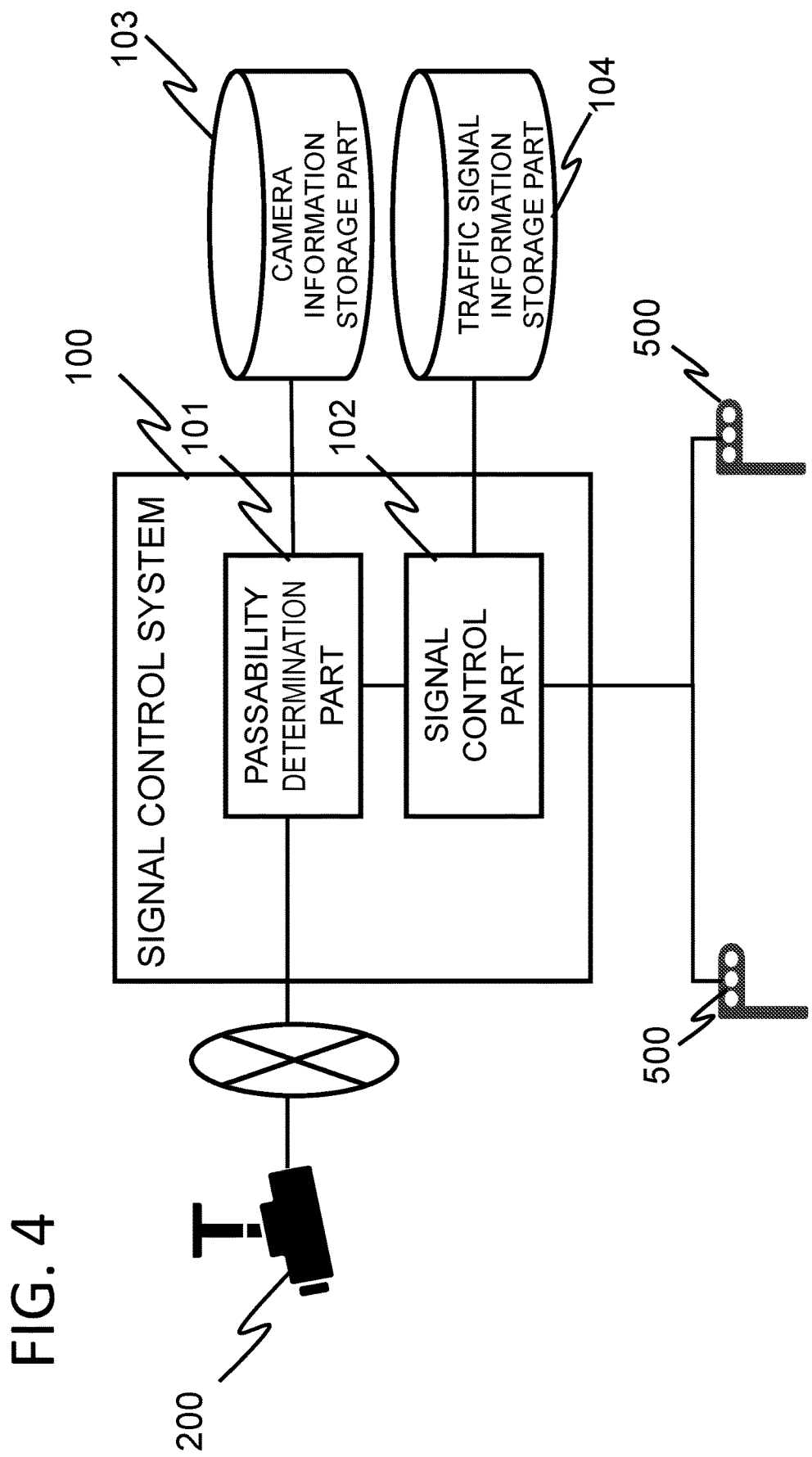
FIG. 4 is a drawing illustrating a configuration of a signal control system according to a first example embodiment of the present invention.

Next, a first example embodiment of the present invention will be described in detail with reference to the drawings. FIG. 4 is a drawing illustrating a configuration of the first example embodiment of the present invention. FIG. 4 shows a configuration of a signal control system 100 connected to a camera 200, a camera information storage part 103, and a traffic signal information storage part 104. The signal control system 100 is provided with a passability determination part 101 and a signal control part 102. The signal control system 100 may be realized by a server for traffic control or a MEC (Multi-access Edge Computing) server disposed in the vicinity of a target area. Further, the signal control system 100 may adopt a distributed configuration in which some of the functions are performed by a computer provided in a traffic signal, in addition to these devices.

Figure 5:
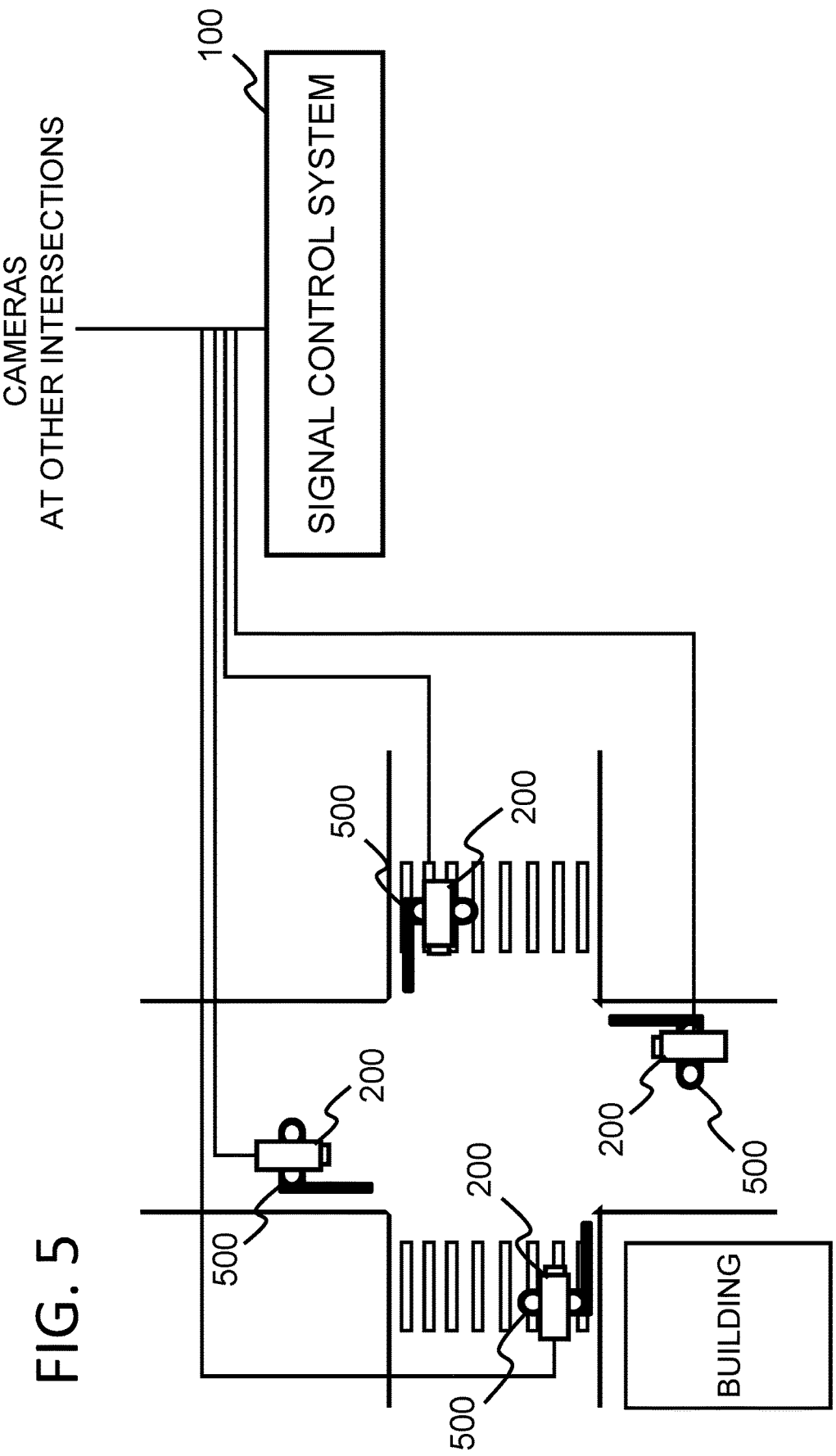
FIG. 5 is a drawing illustrating an example of an arrangement of fixed-point cameras used in the first example embodiment of the present invention.

FIG. 5 is a drawing illustrating an example of an arrangement of the camera(s) 200 used in the first example embodiment of the present invention. In the example embodiment below, as shown in FIG. 5, a camera attached to a traffic signal 500 at an intersection is used as the camera 200. One advantage of using such a camera attached to the traffic signal 500 is that, as shown in FIG. 5, it can be disposed in a position where it can see into the intersection and a road ahead. Also, the existing signal control system can be used as a power source and communication means. Of course, the camera 200 is not limited to the camera 200 attached to the traffic signal 500 shown in FIG. 5, but any other camera disposed around the road in general can be used.

The passability determination part 101 detects an abnormality in an image photographed by the camera 200. The following methods may be used to detect an abnormality in the image.

(1) Comparison with a Reference Image of a Road Photographed in Advance.

The passability determination part 101 compares an image photographed by the camera 200 with the reference image of the road photographed in advance. This makes it possible to detect whether a road is damaged, whether there is a fallen object, or whether there is flooding, etc.

(2) Abnormality in a Vehicle Traffic Line on the Road.

The passability determination part 101 compares a vehicle traffic line on the road set in advance with a vehicle traffic line in an image photographed by the camera 200. This also makes it possible to detect whether or not a road is damaged and/or whether or not there is a fallen object.

(3) Presence or Absence of Vehicle Movement in the Image not Pursuant to the Traffic Signal.

The passability determination part 101 checks a state of a traffic signal and a movement of a vehicle in an image and infers that there is an abnormality on the road when a vehicle moves not pursuant to the state of the traffic signal. For example, if the vehicle does not move for a long time even though the signal light in the image is green, the passability determination part 101 determines that there is an abnormality. Also, at the time, the passability determination part 101 may check whether or not a person is on board the vehicle. For example, if a vehicle stops in a center of a lane and there is no person on board the vehicle, it can be inferred that the boarding person of the vehicle have left the vehicle for some reason. The passability determination part 101 also determines that there is an abnormality in this case.

When detecting an abnormality in an image as described above, the passability determination part 101 determines whether or not a road section imaged in the image is passable on the basis of a content of the abnormality. For example, the passability determination part 101 determines whether or not the road section is passable on the basis of the size of a hole or a fallen object on the road and the degree of flooding. Further, when a vehicle traffic line on the road significantly deviates from a normal one or when a vehicle is not moving, the passability determination part 101 may also determine the passability of the road on the basis of the extent thereof.

When the passability determination part 101 determines that the road section is impassable, it refers to the camera information storage part 103, identifies an impassable section (closed section), and requests the signal control part 102 to perform control.

FIG. 6 is a drawing showing an example of camera information stored in the camera information storage part 103. In the example of FIG. 6, the road section (photographed section) in which each camera 200 is photographed is set. For example, when it is determined that the road is impassable by an image photographed by the camera 200 with camera ID=0001, a road section between intersections A001 and A002 is identified as a closed section.

Upon receiving information of the closed section from the passability determination part 101, the signal control part 102 refers to the traffic signal information storage part 104 and acquires information of traffic signals 500 at intersections at both ends. Then, the signal control part 102 causes the traffic signals 500 at both ends of the closed section to start displaying a lighting pattern that prohibits entry into a closed section.

FIG. 7 is a drawing showing an example of traffic signal information stored in the traffic signal information storage part 104. In the example showing in FIG. 7, for each intersection, ID of a traffic signal disposed at that intersection and its type information are set in the traffic signal information. For example, it is shown that four traffic signals with IDs 1001N to 1001W are disposed at an intersection A001 and all of them have three arrow lights for left, straight and right.

The signal control part 102 refers to such traffic signal information described above, decides a lighting pattern that prohibits entry into the closed section according to the type information thereof, and causes the traffic signal to start displaying the lighting pattern decided.

Figure 8:
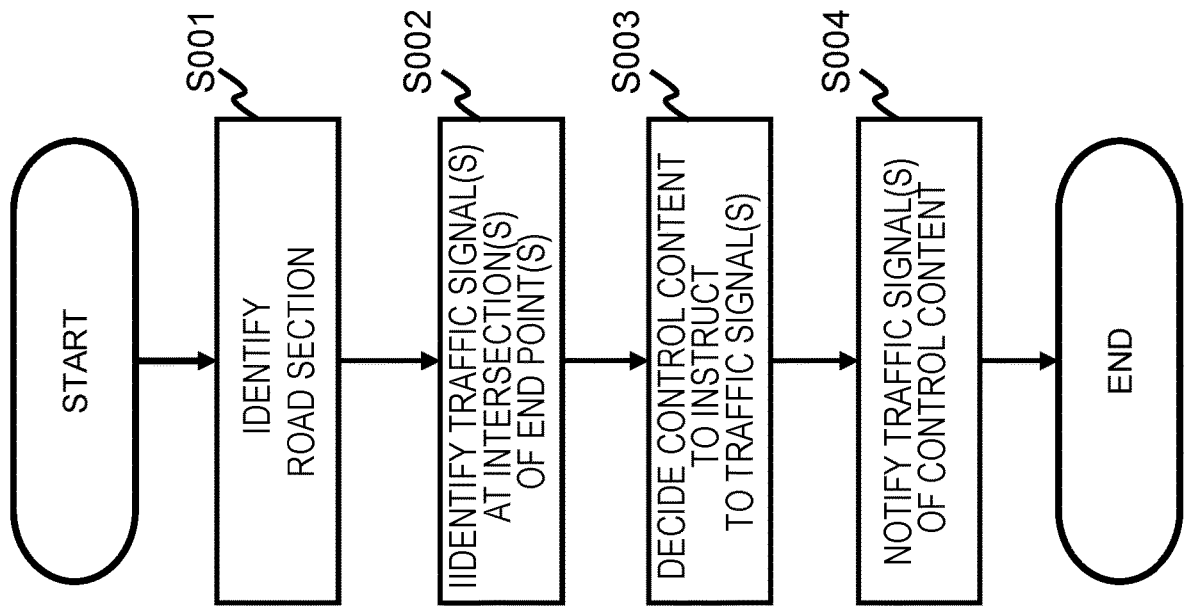
FIG. 8 is a flowchart showing an operation of the signal control system according to the first example embodiment of the present invention.

Next, an operation of the present example embodiment will be described in detail with reference to the drawings. FIG. 8 is a flowchart showing an operation of the signal control system 100 according to the first example embodiment of the present invention after detecting an abnormality in an image. With reference to FIG. 8, the signal control system 100 first refers to the camera information storage part 103 to identify a road section in which an abnormality is detected in the image (step S001). Here, for example, it is presumed that a road between an intersection A001 and an intersection A002 in FIG. 9 is impassable.

Next, the signal control system 100 refers to the traffic signal information storage part 104 to identify a traffic signal(s) at an intersection(s) that is an end point(s) of the road section identified (step S002). Here, for example, it is presumed that traffic signals 1001N, 1001W, and 1001S at the intersection A001 are identified as shown in FIG. 9 and FIG. 10.

Next, the signal control system 100 decides a control content to instruct the traffic signal(s) identified (step S003).

Figure 9:
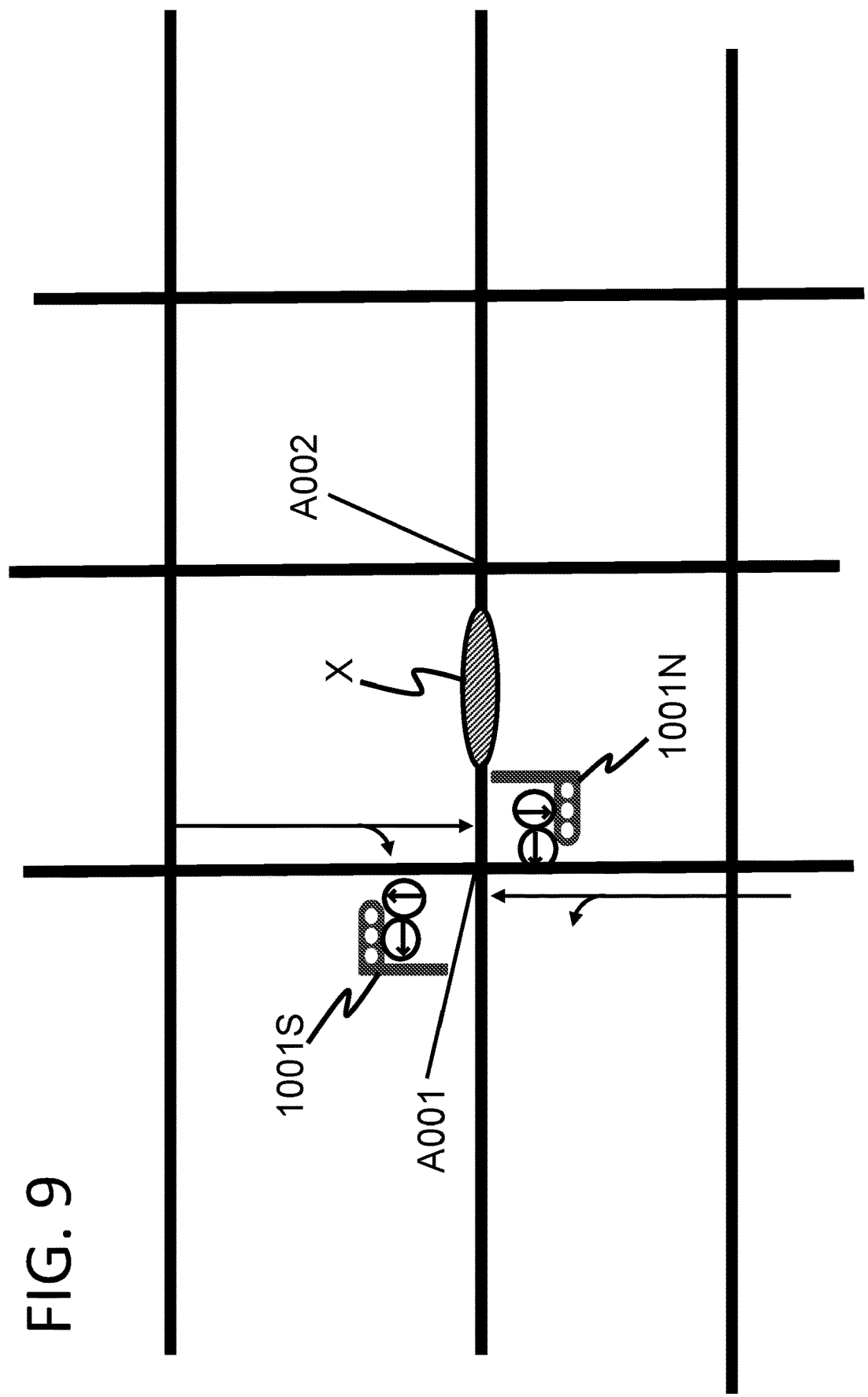
FIG. 9 is a drawing for describing the operation of the signal control system according to the first example embodiment of the present invention.
Figure 10:
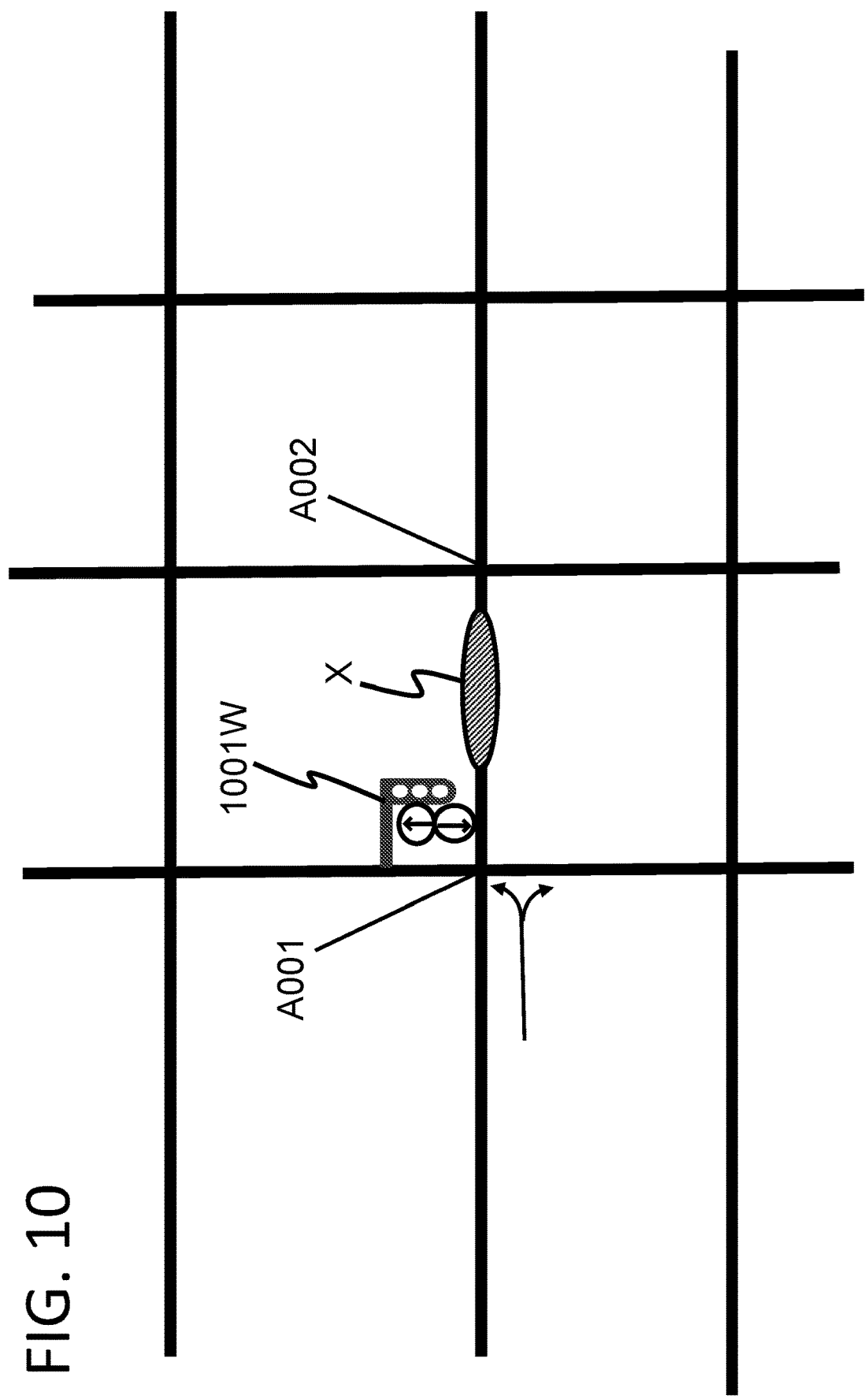
FIG. 10 is a drawing for describing the operation of the signal control system according to the first example embodiment of the present invention.

For example, in order to prevent vehicles from entering the closed section mentioned above, the signal control system 100 decides to display a green arrow light, which allows vehicles to go straight and turn right, instead of a green light for the traffic signal 1001N in FIG. 9. Likewise, for example, the signal control system 100 decides to display a green arrow light, which allows vehicles to go straight and turn left, instead of a green light for the traffic signal 1001S in FIG. 9. Further, for example, the signal control system 100 decides to display a green arrow light, which allows vehicles to turn right and turn left, instead of a green light for the traffic signal 1001W in FIG. 10.

Finally, the signal control system 100 notifies the traffic signal(s) identified of the control content decided (step S004). This prevents vehicles from entering the closed section, as shown in FIG. 9 and FIG. 10. Although not shown in FIG. 9 and FIG. 10, traffic signal(s) at the intersection A002 may similarly be instructed to display lighting that prevents vehicles from entering the closed section.

As described above, according to the present example embodiment, it is possible to detect a closed section caused by road surface damage, vehicles accident, or the like, by means of the camera 200 and to prevent vehicles from further inflowing into the closed section.

Second Example Embodiment

Next, a second example embodiment will be described in which a vehicle is prohibited from entering a closed section by displaying a flashing red light and a message, instead of green arrow light. Since a configuration and an operation of the second example embodiment are substantially the same as those of the first example embodiment, the differences will be mainly described below.

Figure 11:
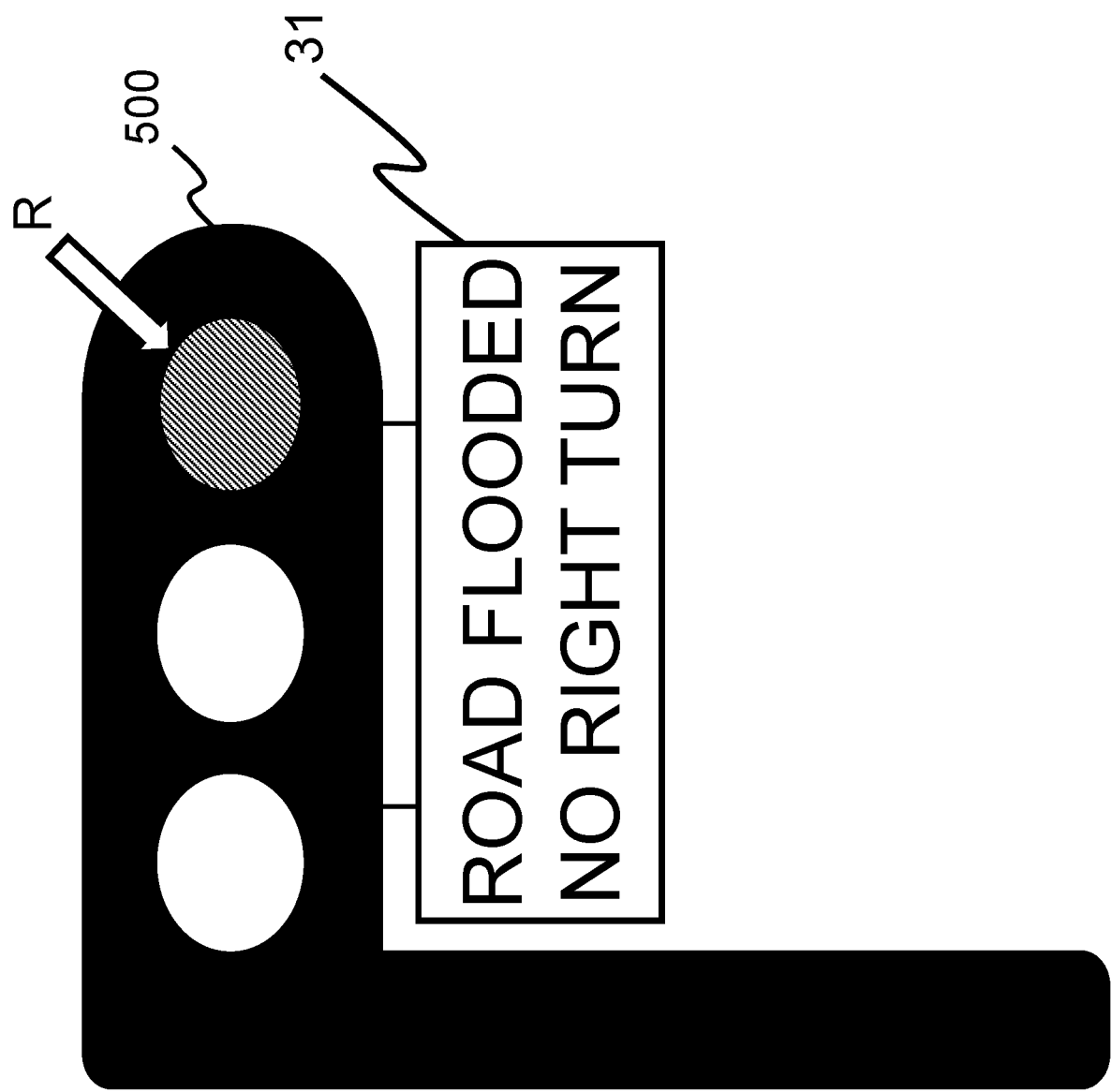
FIG. 11 is a drawing for describing a configuration and an operation of a traffic signal used in a second example embodiment of the present invention.

FIG. 11 is a drawing for describing a configuration and an operation of a traffic signal used in the second example embodiment of the present invention. As shown in FIG. 11, the traffic signal used in the second example embodiment is provided with an electric display board 31 and can display a message together with a flashing red light.

Upon receiving information of a closed section from the passability determination part 101, the signal control part 102 of the present example embodiment causes traffic signals at both ends of the closed section to display a message that prohibits entry into the closed section together with a flashing red light. In the example of FIG. 11, a message "ROAD FLOODED NO RIGHT TURN" is displayed. As a result, it is possible to give an instruction equivalent to the instruction displaying the green arrow light for the traffic signal 1001S shown in FIG. 9.

According to the present example embodiment, in addition to an effect of the first example embodiment, it is possible not only to display a light but also to communicate a state of the closed section and a reason for prohibiting entry. Of course, instead of displaying the message "ROAD FLOODED NO RIGHT TURN", through a speaker installed at the traffic signal, etc., it may provide announcements such as "ROAD FLOODED BETWEEN INTERSECTIONS A001 AND A002" or "NO ENTRY INTO EASTERN DIRECTION FROM INTERSECTION A001".

In the example embodiment described above, the electric display board 31 need only be disposed at a location visible to a driver of a vehicle and does not necessarily have to be provided at the traffic signal.

Third Example Embodiment

The following describes a third example embodiment in which, in addition to signal control, a vehicle in a surrounding area of a closed section is notified of the presence of a closed section and a location thereof. Since a configuration and an operation of the third example embodiment are substantially the same as those of the first example embodiment, the differences will be mainly described below.

Figure 12:
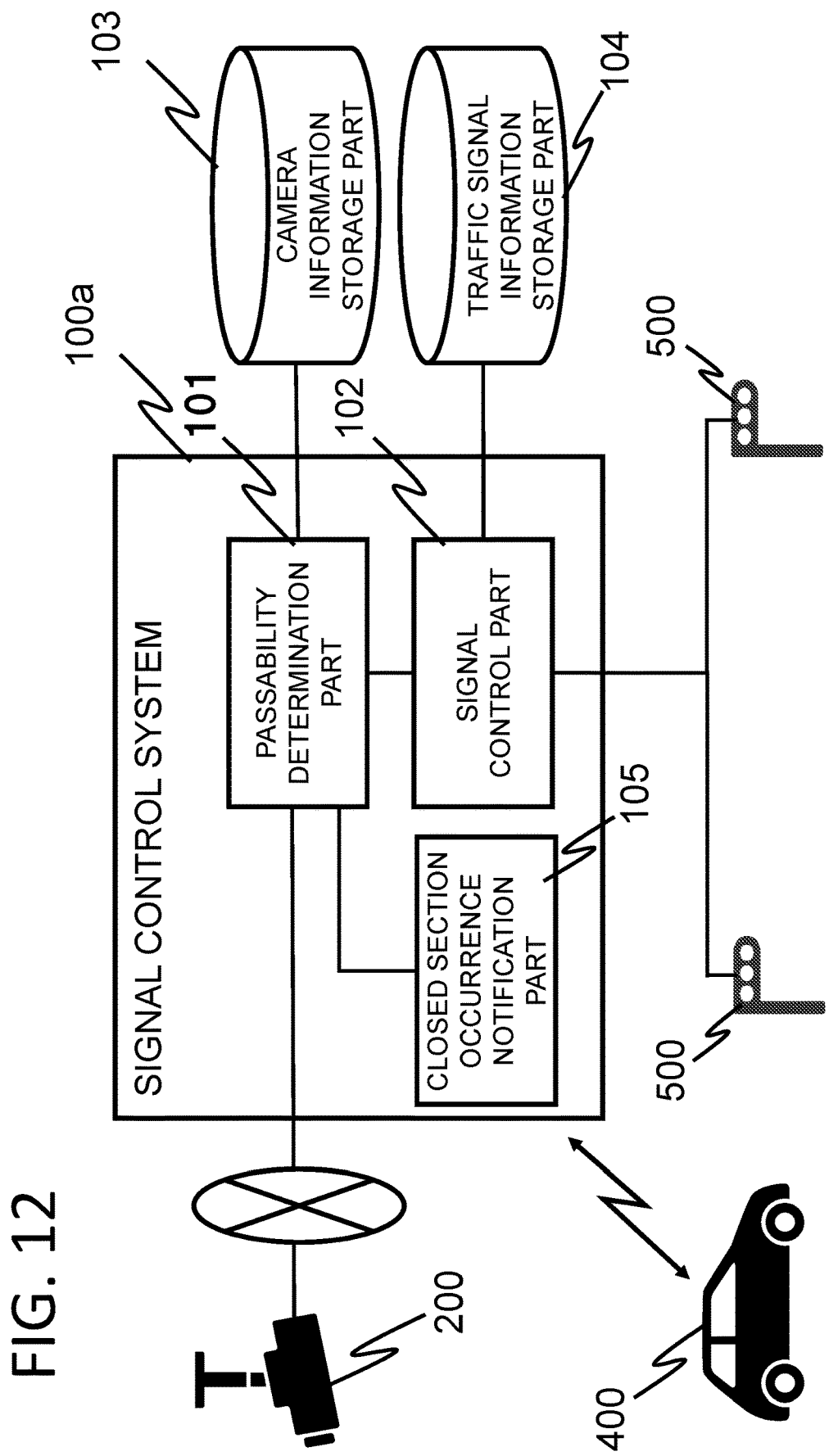
FIG. 12 is a drawing illustrating a configuration of a signal control system according to a third example embodiment of the present invention.

FIG. 12 is a block diagram illustrating the configuration of a signal control system 100a according to the third example embodiment of the present invention. The signal control system 100a differs from the signal control system 100 of the first example embodiment shown in FIG. 4 in that a closed section occurrence notification part 105 is added.

Upon receiving notification that there is a closed section from the passability determination part 101, the closed section occurrence notification part 105 functions as a notification means for transmitting a location of the closed section to an in-vehicle terminal of a vehicle 400 in a control target area. In addition, as a method of notifying the vehicle 400 of the closed section from the signal control system 100a, it is possible to notify the in-vehicle terminal as road traffic information through any communication means such as a wireless communication line provided by a telecommunications carrier, a broadcasting line, and road-to-vehicle communication.

Upon receiving notification about the closed section, the in-vehicle terminal of the vehicle 400 can display this fact on a display device or the location of the closed section on a map thereon. Further, as far as a route guidance service is in operation, the in-vehicle terminal of the vehicle 400 can guide a detour route that avoids the closed section.

In addition, in a case where a traveling route is known in advance such as in a case where a vehicle 400 in a control target area is an automatic driving vehicle, a detour route can be also calculated in the signal control system 100a side. In this case, the signal control system 100a may provide a calculated detour route in addition to the closed section.

As described above, according to the present example embodiment, it is possible to reliably notify the vehicle 400 in the control target area of the occurrence of a closed section.

Fourth Example Embodiment

Also, the first and the second example embodiments described above can be combined. Concretely, the following describes a fourth example embodiment in which the signal control system 100 causes a traffic light to selectively perform (A) displaying a green arrow light and (B) flashing a red light and outputting a message on the basis of a content of an abnormality in an image photographed by the camera 200. Since a configuration and an operation of the fourth example embodiment are substantially the same as those of the first example embodiment, the differences will be mainly described below.

Figure 13:
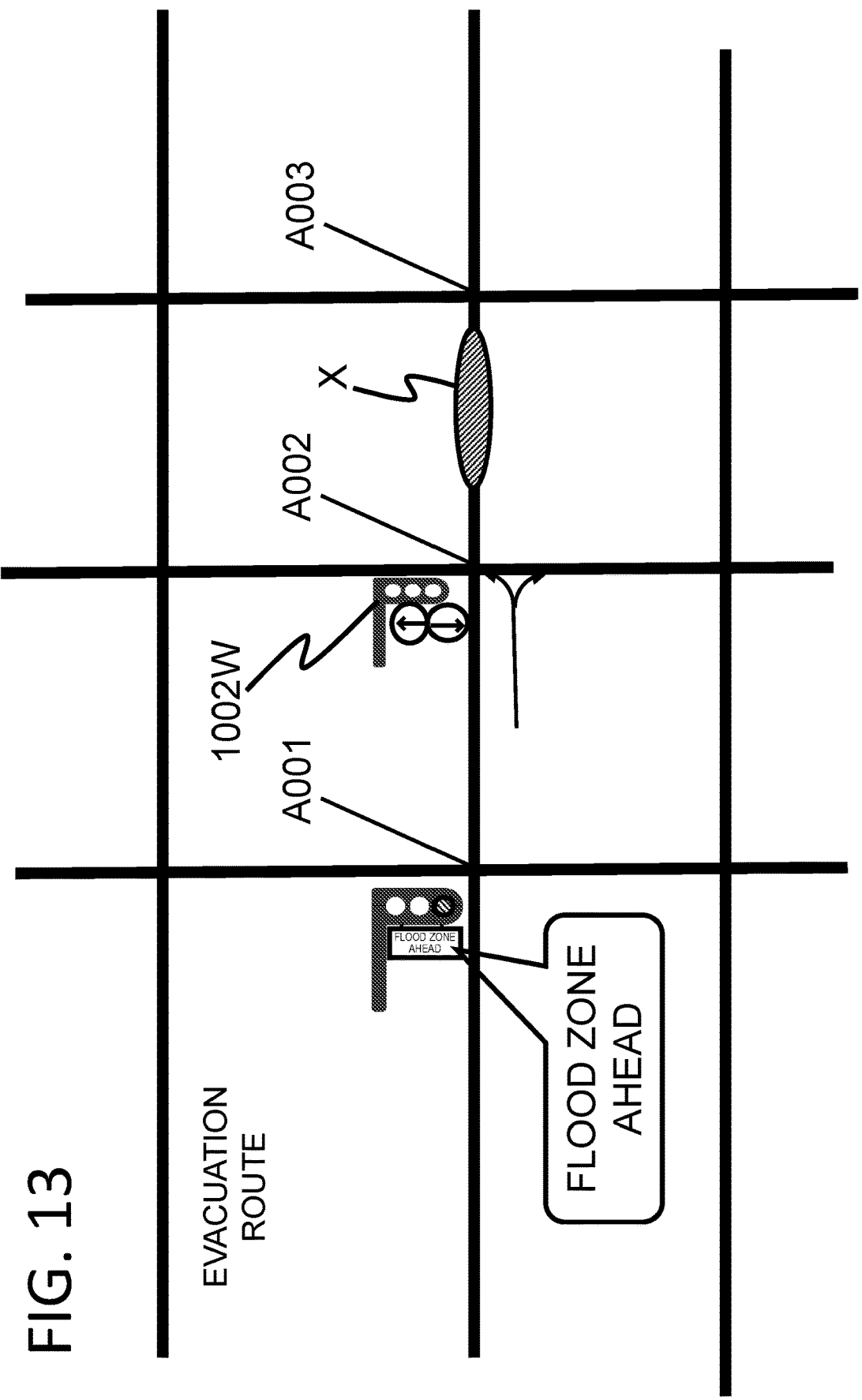
FIG. 13 is a drawing for describing an operation of a signal control system according to a fourth example embodiment of the present invention.

FIG. 13 is a drawing showing a concrete example of signal control performed by a signal control system according to the fourth example embodiment of the present invention. In FIG. 13, the sign X indicates a closed section including an abnormal area. In the example of FIG. 13, the signal control system 100 causes a traffic light to selectively perform (A) displaying a green arrow light and (B) flashing a red light and outputting a message on the basis of a distance between a traffic signal and an area determined to be abnormal in an image photographed by the camera. Concretely, the signal control system 100 instructs a traffic signal at the intersection A002 near the closed section to (A) display a green arrow light to prevent vehicles from inflowing into the closed section (first control). On the other hand, the signal control system 100 instructs a traffic signal at the intersection A001 away from the closed section to (B) flashing a red light and output a message (second control). Thus, the signal control system reduces the number of vehicles traveling from the intersection A001 to the intersection A002, and furthermore, explicitly designates the direction of travel at the intersection A002 immediately before the closed section.

Note that the example in FIG. 13 is merely an example, and various modifications can be made on the basis of a content of an abnormality in an image. For example, the signal control system 100 may instruct a traffic signal at the intersection A002 near the closed section to (B) flash a red light and output a message, and it may instruct a traffic signal at the intersection A001 away from the closed section to (A) display a green arrow light. In this case, for example, it is also preferable to change a content of the message outputted at the intersection A002 near the closed section. For example, a message that conveys a danger of entering the closed section, for example, a message such as "FLOOD ZONE AHEAD, VEHICLES SUBMERGED," may be displayed.

As described, according to the present example embodiment, it is possible to control a traffic volume step by step according to the content of the abnormality in the image, and it is possible to reduce an occurrence of traffic congestions around an intersection where traffic is restricted.

While each example embodiment of the present invention has been described, it is to be understood that the present invention is not limited to the example embodiments above and that further modifications, replacements, and adjustments may be added without departing from the basic technical concept of the present invention. For example, the apparatus configuration, the configuration of each element, and the expression of the data shown in each drawing are examples to facilitate understanding of the present invention and are not limited to the configurations shown in the drawings.

For example, the camera 200 is installed at an intersection in the example embodiments described above, however, the camera 200 is not limited thereto. Further, the signal control system detects a closed section from an image photographed by a camera in the example embodiments above, however, the signal control system may detect a closed section by referring to other types of information. For example, the signal control system may also use disaster information from local governments and/or the meteorological agency together with information from a probe car system to detect an occurrence of a closed section.

Further, in the example embodiments described above, the camera information storage part 103 and the traffic signal information storage part 104 are provided outside the signal control system, however, these storage parts may be provided in an auxiliary storage device of a computer that configures the signal control system.

Further, in the example embodiments described above, the signal control system uses a green arrow light or a flashing red light and an outputting message, however, the signal patterns are not limited thereto as long as they can prevent traffic from inflowing into a closed section. For example, if permitted by traffic laws and regulations, a configuration can be adopted to alert the driver by flashing a red light that turns on simultaneously with the green arrow light, flashing a green light, or the like.

Figure 14:
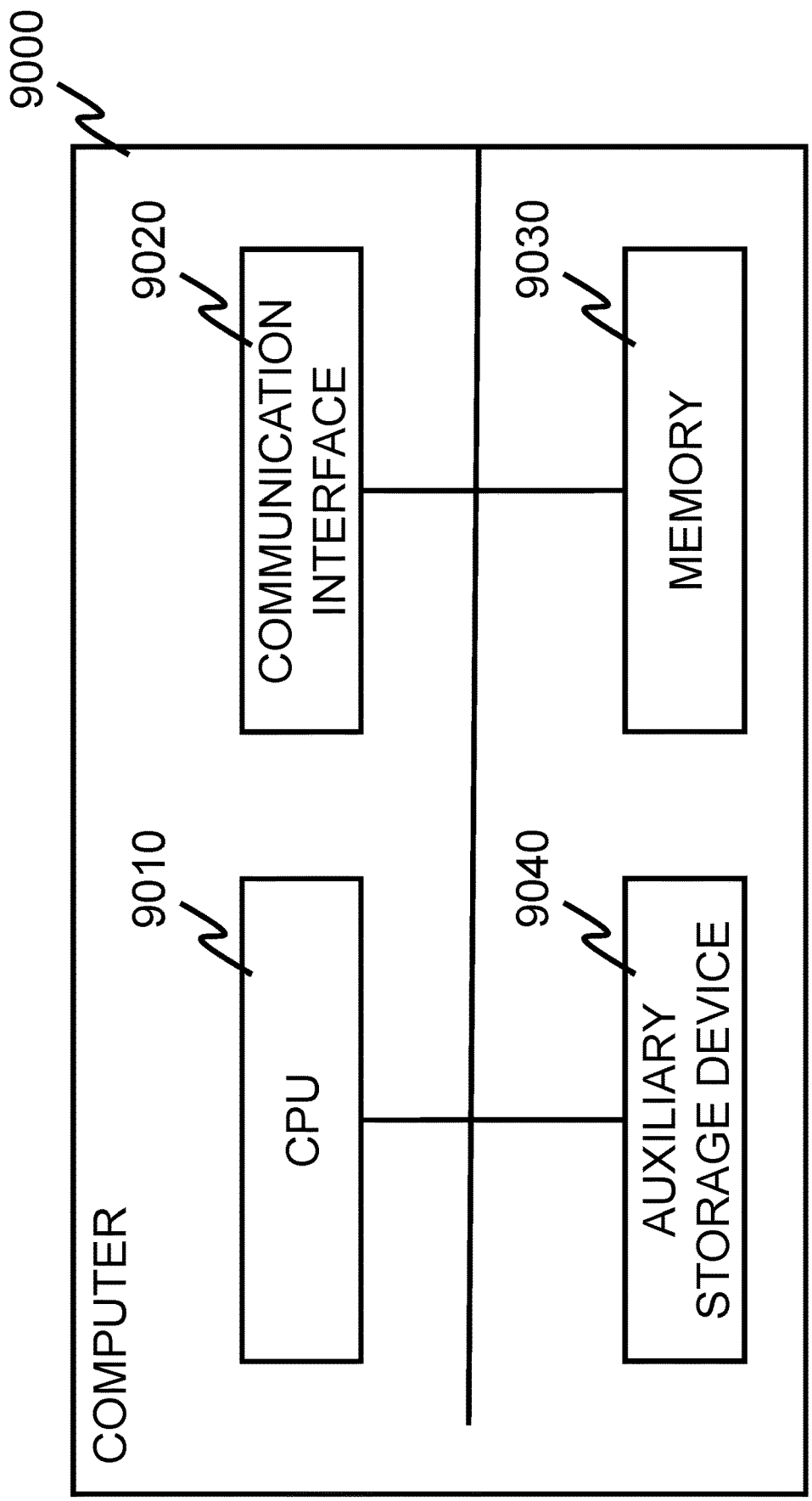
FIG. 14 is a drawing illustrating a configuration of a computer that can function as the signal control system of the present invention.

Further, the procedures described in each example embodiment above can be implemented by a program causing a computer (9000 in FIG. 14) that functions as the signal control system to realize the functions of the signal control system. FIG. 14 illustrates such a computer configured to be provided with a CPU (Central Processing Unit) 9010, a communication interface 9020, a memory 9030, and an auxiliary storage device 9040. In other words, the CPU 9010 in FIG. 14 executes a passability determination program and/or signal control program.

In other words, each part (each processing means or function) of the signal control systems 100 and 100a described above can be realized by a computer program causing a processor installed in these apparatuses to execute each of the processes described above using the hardware thereof.

Finally, preferred modes of the present invention will be summarized. A part or the entire of the example embodiments disclosed above may be also described as the following modes, but not limited thereto.

[Mode 1]

(Refer to the signal control system according to the first aspect.)

[Mode 2]

The signal control part in the signal control system described above may perform to prevent the traffic from inflowing into the closed section caused by a green arrow light as a control content of the traffic signal device.

[Mode 3]

The signal control part in the signal control system above may further perform control to change signal lights in all directions to flashing red lights and to output a message that prohibits entry into the closed section as a control content of the traffic signal device.

[Mode 4]

The signal control part in the signal control system above may perform any one of a first control or a second control on a basis of a content of the abnormality in the image photographed by the camera, wherein the first control is to prevent the traffic from inflowing into the closed section caused by a green arrow light, and the second control is to change signal lights in all directions to flashing red lights and to output a message that prohibits entry into the closed section.

[Mode 5]

The signal control part in the signal control system above may perform any one of the first control or the second control on a basis of a distance between the traffic signal device and an area determined to be abnormal in the image photographed by the camera.

[Mode 6]

The passability determination part in the signal control system above may detect an abnormality on the road by comparing the image with a reference image of the road photographed in advance to determine the passability of the road section.

[Mode 7]

The passability determination part in the signal control system above may detect an abnormality on the road by comparing a vehicle traffic line on the road set in advance with a vehicle traffic line in the image to determine the passability of the road section.

[Mode 8]

The passability determination part in the signal control system above may detect an abnormality on the road on a basis of presence or absence of a vehicle movement in the image not pursuant to a signal light to determine the passability of the road section.

[Mode 9]

The signal control system above may further include a notification part for notifying a vehicle located in the control target area of an occurrence of the closed section.

[Mode 10]

(Refer to the signal control method according to the second aspect.)

[Mode 11]

(Refer to the program recording medium according to the third aspect.)

The above Modes 10 and 11 can be expanded in the same way as Mode 1 is expanded to Modes 2 to 9.

The disclosure of Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST

10, 100, 100a: signal control system
11: passability determination part
12: signal control part
20, 200: camera
30, 500, 1001N, 1001S, 1001W, 1002W: traffic signal
31: electric display board
101: passability determination part
102: signal control part
103: camera information storage part
104: traffic signal information storage part
105: closed section occurrence notification part
400: vehicle
A001 to A003: intersection
X: closed section
9000: computer
9010: CPU
9020: communication interface
9030: memory

What is claimed is:

1. A signal control system capable of acquiring an image of a road from a camera disposed around a road in a control target area, the signal control system comprising:
at least a processor; and
a memory in circuit communication with the processor, wherein the processor is configured to execute program instructions stored in the memory to implement:
a passability determination part for determining passability of a road section starting from an intersection on a basis of an abnormality in an image photographed by the camera; and
a signal control part for controlling a traffic signal device disposed at an intersection included in the road section so as to prevent traffic from inflowing into a closed section, and wherein
the passability determination part detects an abnormality on the road on a basis of presence of absence of a vehicle movement in the image not pursuant to a signal light to determine the passability of the road section.

2. The signal control system according to claim 1, wherein the signal control part performs to prevent the traffic from inflowing into the closed section caused by a green arrow light as a control content of the traffic signal device.

3. The signal control system according to claim 1, wherein the signal control part further performs control to change signal lights in all directions to flashing red lights and to output a message that prohibits entry into the closed section as a control content of the traffic signal device.

4. The signal control system according to claim 1, wherein the signal control part performs any one of a first control or a second control on a basis of a content of the abnormality in the image photographed by the camera, wherein
the first control is to prevent the traffic from inflowing into the closed section caused by a green arrow light, and
the second control is to change signal lights in all directions to flashing red lights and to output a message that prohibits entry into the closed section.

5. The signal control system according to claim 4, wherein the signal control part performs any one of the first control or the second control on a basis of a distance between the traffic signal device and an area determined to be abnormal in the image photographed by the camera.

6. The signal control system according to claim 1, wherein the passability determination part detects an abnormality on the road by comparing the image with a reference image of the road photographed in advance to determine the passability of the road section.

7. The signal control system according to claim 1, wherein the passability determination part detects an abnormality on the road by comparing a vehicle traffic line on the road set in advance with a vehicle traffic line in the image to determine the passability of the road section.

8. The signal control system according to claim 1, further comprising
a notification part for notifying a vehicle located in the control target area of an occurrence of the closed section.

9. The signal control system according to claim 2, wherein the signal control part further performs control to change signal lights in all directions to flashing red lights and to output a message that prohibits entry into the closed section as a control content of the traffic signal device.

10. The signal control system according to claim 2, wherein
the signal control part performs any one of a first control or a second control on a basis of a content of the abnormality in the image photographed by the camera, wherein
the first control is to prevent the traffic from inflowing into the closed section caused by a green arrow light, and
the second control is to change signal lights in all directions to flashing red lights and to output a message that prohibits entry into the closed section.

11. The signal control system according to claim 3, wherein
the signal control part performs any one of a first control or a second control on a basis of a content of the abnormality in the image photographed by the camera, wherein
the first control is to prevent the traffic from inflowing into the closed section caused by a green arrow light, and
the second control is to change signal lights in all directions to flashing red lights and to output a message that prohibits entry into the closed section.

12. The signal control system according to claim 2, wherein
the passability determination part detects an abnormality on the road by comparing the image with a reference image of the road photographed in advance to determine the passability of the road section.

13. The signal control system according to claim 3, wherein
the passability determination part detects an abnormality on the road by comparing the image with a reference image of the road photographed in advance to determine the passability of the road section.

14. The signal control system according to claim 4, wherein
the passability determination part detects an abnormality on the road by comparing the image with a reference image of the road photographed in advance to determine the passability of the road section.

15. The signal control system according to claim 5, wherein
the passability determination part detects an abnormality on the road by comparing the image with a reference image of the road photographed in advance to determine the passability of the road section.

16. The signal control system according to claim 2, wherein
the passability determination part detects an abnormality on the road by comparing a vehicle traffic line on the road set in advance with a vehicle traffic line in the image to determine the passability of the road section.

17. The signal control system according to claim 3, wherein
the passability determination part detects an abnormality on the road by comparing a vehicle traffic line on the road set in advance with a vehicle traffic line in the image to determine the passability of the road section.

18. The signal control system according to claim 1, further comprising:
a camera information storage that stores, for each camera from among a plurality of cameras, information indicating a road section photographed by a respective camera, wherein
a first camera from among the plurality of cameras photographed the image in which the abnormality is detected, and
the passability determination part determines from information indicating road sections stored in the camera information storage that a road section corresponding to the first camera is the closed section.

19. A signal control method performed by a computer capable of acquiring an image from a camera disposed around a road in a control target area, comprising:

determining passability of a road section starting from an intersection on a basis of an abnormality in an image photographed by the camera; and controlling a traffic signal device disposed at an intersection included in the road section so as to prevent traffic from inflowing into a closed section, and wherein the passability determination part detects an abnormality on the road on a basis of presence or absence of a vehicle movement in the image not pursuant to a signal light to determine the passability of the road section.

20. A non-transitory computer-readable medium storing a program that causes a computer capable of acquiring an image of a road from a camera disposed around a road in a control target area to execute:

a process of determining passability of a road section starting from an intersection on a basis of an abnormality in an image photographed by the camera; and a process of controlling a traffic signal device disposed at an intersection included in the road section so as to prevent traffic from inflowing into a closed section, and wherein the passability determination part detects an abnormality on the road on a basis of presence or absence of a vehicle movement in the image not pursuant to a signal light to determine the passability of the road section.

* * * * *